United States Patent
Lee et al.

(10) Patent No.: US 9,820,133 B2
(45) Date of Patent: Nov. 14, 2017

(54) METHOD AND USER EQUIPMENT FOR PERFORMING D2D SERVICE IN WIRELESS COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Eunjong Lee, Anyang-si (KR); Genebeck Hahn, Anyang-si (KR); Heetae Roh, Seongnam-si (KR); Jangwon Lee, Seoul (KR); Jaehoon Chung, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 160 days.

(21) Appl. No.: 14/651,631

(22) PCT Filed: Sep. 13, 2013

(86) PCT No.: PCT/KR2013/008294
§ 371 (c)(1),
(2) Date: Jun. 11, 2015

(87) PCT Pub. No.: WO2014/092305
PCT Pub. Date: Jun. 19, 2014

(65) Prior Publication Data
US 2015/0327048 A1     Nov. 12, 2015

Related U.S. Application Data

(60) Provisional application No. 61/736,498, filed on Dec. 12, 2012.

(51) Int. Cl.
*H04W 4/00* (2009.01)
*H04W 8/00* (2009.01)
(Continued)

(52) U.S. Cl.
CPC ........... *H04W 8/005* (2013.01); *H04W 4/005* (2013.01); *H04W 72/0406* (2013.01); *H04W 76/023* (2013.01); *H04W 92/18* (2013.01)

(58) Field of Classification Search
CPC .............................. H04W 8/005; H04W 4/005
(Continued)

(56) References Cited

U.S. PATENT DOCUMENTS

2009/0325625 A1* 12/2009 Hugl ..................... H04W 52/16
                                                                              455/522
2010/0040029 A1   2/2010 Doppler et al.
(Continued)

FOREIGN PATENT DOCUMENTS

WO   2012/152224   11/2012
WO   2012/166969   12/2012

OTHER PUBLICATIONS

PCT International Application No. PCT/KR2013/008294, Written Opinion of the International Searching Authority dated Dec. 30, 2013, 9 pages.

*Primary Examiner* — Samina Choudhry
(74) *Attorney, Agent, or Firm* — Lee, Hong, Degerman, Kang & Waimey

(57) ABSTRACT

A method and user equipment (UE) for performing device-to-device (D2D) communication in a wireless communication system is disclosed. The method of performing D2D communication by a D2D UE includes informing a mobility management entity (MME) about a first identifier (ID) of a target UE of D2D communication, receiving information regarding a second ID and a D2D peer discovery section,
(Continued)

corresponding to the target UE, determining whether D2D communication with the target UE is possible using the received information, requesting the D2D communication with the target UE to the MME when the D2D communication with the target UE is possible, and receiving a D2D link ID allocated to the D2D link with the target UE from a base station (BS) receiving approval of communication of the MME.

12 Claims, 6 Drawing Sheets

(51) Int. Cl.
*H04W 72/04* (2009.01)
*H04W 76/02* (2009.01)
*H04W 92/18* (2009.01)

(58) Field of Classification Search
USPC .......................................................... 370/329
See application file for complete search history.

(56) References Cited

U.S. PATENT DOCUMENTS

| | | |
|---|---|---|
| 2012/0179789 A1 | 7/2012 | Griot et al. |
| 2012/0265818 A1 | 10/2012 | Van Phan et al. |
| 2013/0287012 A1* | 10/2013 | Pragada .............. H04W 76/045 370/338 |
| 2014/0078971 A1* | 3/2014 | Bontu ................... H04W 8/005 370/329 |

* cited by examiner

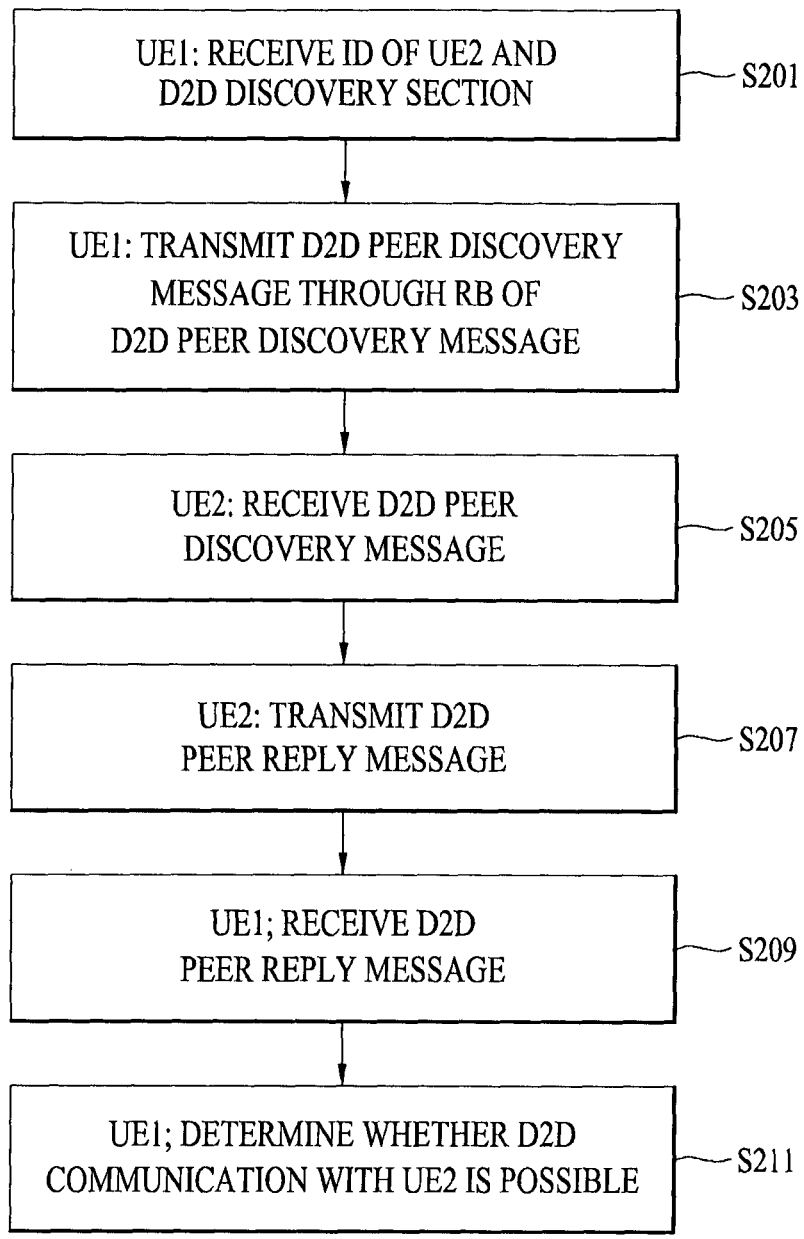

METHOD AND USER EQUIPMENT FOR PERFORMING D2D SERVICE IN WIRELESS COMMUNICATION SYSTEM

CROSS-REFERENCE TO RELATED APPLICATIONS

This application is the National Stage filing under 35 U.S.C. 371 of International Application No. PCT/KR2013/008294, filed on Sep. 13, 2013, which claims the benefit of U.S. Provisional Application No. 61/736,498, filed on Dec. 12, 2012, the contents of which are all hereby incorporated by reference herein in their entirety.

TECHNICAL FIELD

The present invention relates to wireless communication, and more particularly, to a method and user equipment (UE) for performing device-to-device (D2D) communication in a wireless communication system.

BACKGROUND ART

Recently, as smart phones and tablet personal computers (PCs) have entered widespread use and high-capacity multimedia communication have been actively used, mobile traffic has remarkably increased. In the future, it is expected that mobile traffic will double every year. Most mobile traffic is transmitted through a base station (BS). Thus, communication service carriers are currently faced with serious problems in terms of network load. Thus, in order to process increased traffic, communication carriers have increased the number of network facilitates and have hurriedly commercialized next-generation mobile communication standards for effectively processing a large amount of traffic, such as mobile world interoperability for microwave access (WiMAX) and long term evolution (LTE). However, at this time, other solutions are needed to cope with dramatic increase in wireless traffic in the future.

Device-to-device (D2D) communication refers to distributed communication technology for directly transmitting traffic between adjacent nodes without infrastructures such as a BS. In a D2D communication environment, each node such as portable user equipment (UE) and so on searches for another UE that is physically adjacent thereto, establishes a communication session therewith and then transmits traffic. Likewise, D2D communication distributes traffic concentrated at a BS to overcome traffic overload problems and thus, has drawn attention as the next-generation mobile communication technology successor to 4G. For this reason, standard institutes such as the 3rd generation partnership project (3GPP), the institute of electrical and electronic engineers (IEEE), and the like have established D2D communication standards based on long term evolution-A (LTE-A) or wireless-fidelity (Wi-Fi), and Qualcomm and so on have also developed unique D2D communication technologies.

D2D communication is predicted to create new communication services as well as to increase performance of mobile communication systems. In addition, D2D communication can support services such as an adjacency-based social network service, a network game, or the like and can overcome problems in terms of connection of UEs in a shadow region using a D2D link as a relay. Thus, D2D technologies are predicted to provide new services in various fields.

In reality, technology for communication between devices, such as infrared communications, ZigBee, radio frequency identification (RFID), and near field communication (NFC) based thereon have already entered widespread use. However, these technologies only support communication with one partner within a very limited distance (about 1 m). Thus, strictly, it is difficult to classify these technologies as D2D communication technologies for distributing traffic of a BS.

Thus far, D2D communication has been described. However, until now, details of network-assisted D2D for implementing D2D communication with the help of a cellular network have not been proposed.

DISCLOSURE

Technical Problem

An object of the present invention devised to solve the problem lies in a method of performing device-to-device (D2D) communication by a D2D user equipment (UE) in a wireless communication system.

Another object of the present invention devised to solve the problem lies in a D2D UE for performing D2D communication in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for performing device-to-device (D2D) communication by a D2D user equipment (UE) in a wireless communication system, the method including informing a mobility management entity (MME) about a first identifier (ID) of a target UE of D2D communication, receiving information regarding a second ID and a D2D peer discovery section, corresponding to the first ID, determining whether D2D communication with the target UE is possible through the received information, requesting the D2D communication with the target UE to the MME when the D2D communication with the target UE is possible, and receiving a D2D link ID allocated to a D2D link with the target UE from a base station (BS) receiving approval of communication of the MME.

The D2D peer discovery section may include a section for transmitting a D2D peer discovery message and a section for receiving a D2D peer reply message, and the determining may include transmitting the D2D peer discovery message to the target UE in the section for transmitting the D2D peer discovery message, and receiving the D2D peer reply message from the target UE in the section for receiving the D2D peer reply message and determining whether the D2D communication with the target UE is possible.

The D2D peer discovery message and the D2D peer reply message may be transmitted to a control channel allocated to a specific subframe.

The control channel may be a dedicated channel for a UE for performing D2D communication, and the control channel may be allocated to a specific location of a physical uplink shared channel (PUSCH) or a physical downlink shared channel (PDSCH) resources and a resource block for the control channel may not be allocated when data to be transmitted through the control channel is not present.

The first ID may include a unique phone number of the target UE and the second ID may include a global unique temporary identifier (GUTI).

In another aspect of the present invention, provided herein is a method for performing device-to-device (D2D) communication by a D2D user equipment (UE) in a wireless communication system, the method including receiving information an identifier (ID) of a target UE and a D2D discovery section from a base station (BS) and determining whether D2D communication with the target UE is possible, transmitting a result of the determining to the BS, and receiving a D2D link ID allocated to a D2D link with the target UE from the BS when the D2D communication with the target UE is possible The D2D link ID may include a radio network temporary identifier (RNTI) and the method may further include receiving resource information through the RNTI and performing the D2D communication with the target UT when the RNTI allocated to the D2D link is received from the BS, and receiving resource information through a pre-allocated C-RNTI and performing cellular communication when the RNTI allocated to the D2D link is not received from the BS.

The D2D peer discovery section may include a section for transmitting a D2D peer discovery message and a section for receiving a D2D peer reply message, and the determining may include receiving information regarding the ID of the target UE and the D2D discovery section from the BS, transmitting the D2D peer discovery message to the target UE in the section for transmitting the D2D peer discovery message, and receiving the D2D peer reply message from the target UE in the section for receiving the D2D peer reply message and determining whether the D2D communication with the target UE is possible.

The D2D peer discovery message and the D2D peer reply message may be transmitted to a control channel allocated to a specific subframe.

The control channel may be a dedicated channel for a UE for performing D2D communication, and the control channel may be allocated to a specific location of a physical uplink shared channel (PUSCH) or a physical downlink shared channel (PDSCH) resources, and a resource block for the control channel is not allocated when data to be transmitted through the control channel is not present.

In a further aspect of the present invention, provided herein is a device-to-device (D2D) user equipment (UE) for performing D2D communication in a wireless communication system, the D2D UE including a radio frequency (RF) module for transmitting a radio signal and a processor connected to the RF module, for controlling the RF module, wherein the processor informs a mobility management entity (MME) about a first identifier (ID) of a target UE of D2D communication, receives information regarding a second ID and a D2D peer discovery section, corresponding to the first ID, determines whether D2D communication with the target UE is possible through the received information, requests the D2D communication with the target UE to the MME when the D2D communication with the target UE is possible, and receives a D2D link ID allocated to a D2D link with the target UE from a base station (BS) receiving approval of communication of the MME The D2D peer discovery section may include a section for transmitting a D2D peer discovery message and a section for receiving a D2D peer reply message, and the processor may transmit the D2D peer discovery message to the target UE in the section for transmitting the D2D peer discovery message, and receives the D2D peer reply message from the target UE in the section for receiving the D2D peer reply message and determines whether the D2D communication with the target UE is possible.

The first ID may include a unique phone number of the target UE and the second ID may include a global unique temporary identifier (GUTI).

In a further aspect of the present invention, provided herein is a device-to-device (D2D) user equipment (UE) for performing D2D communication in a wireless communication system, the D2D UE including a radio frequency (RF) module for transmitting a radio signal, and a processor connected to the RF module, for controlling the RF module, wherein the processor receives receiving information an identifier (ID) of a target UE of D2D communication and a D2D discovery section from a base station (BS) and periodically determining whether D2D communication with the target. UE is possible, transmits a result of the determining to the BS, and receives a D2D link ID allocated to a D2D link with the target UE from the BS when the D2D communication with the target UE is possible.

The D2D link ID may include a radio network temporary identifier (RNTI), and the processor may receive resource information through the RNTI and performs the D2D communication with the target UT when the RNTI allocated to the D2D link is received from the BS, and receives resource information through a pre-allocated C-RNTI and performs cellular communication when the RNTI allocated to the D2D link is not received from the BS.

The D2D peer discovery section may include a section for transmitting a D2D peer discovery message and a section for receiving a D2D peer reply message, and the processor may transmit the D2D peer discovery message to the target UE in the section for transmitting the D2D peer discovery message, and receive the D2D peer reply message from the target UE in the section for receiving the D2D peer reply message and determine whether the D2D communication with the target UE is possible.

Advantageous Effects

According to embodiments of the present invention, a target user equipment (UE) of device-to-device (D2D) communication does not have to transmit and receive data to and from a base station (e-NodeB) and thus a UE requesting D2D communication can perform D2D peer discovery regardless of a state of the target UE of the D2D communication.

In addition, when the UE requesting the D2D communication wants to acquire a list of target UEs of the D2D communication, a state of the target UE does not have to be changed to a EPS connection management (ECM) connected state, thereby reducing unnecessary control signaling.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 4 is a flowchart of a D2D peer discovery method according to an embodiment of the present invention;

BEST MODE

Figure 1:
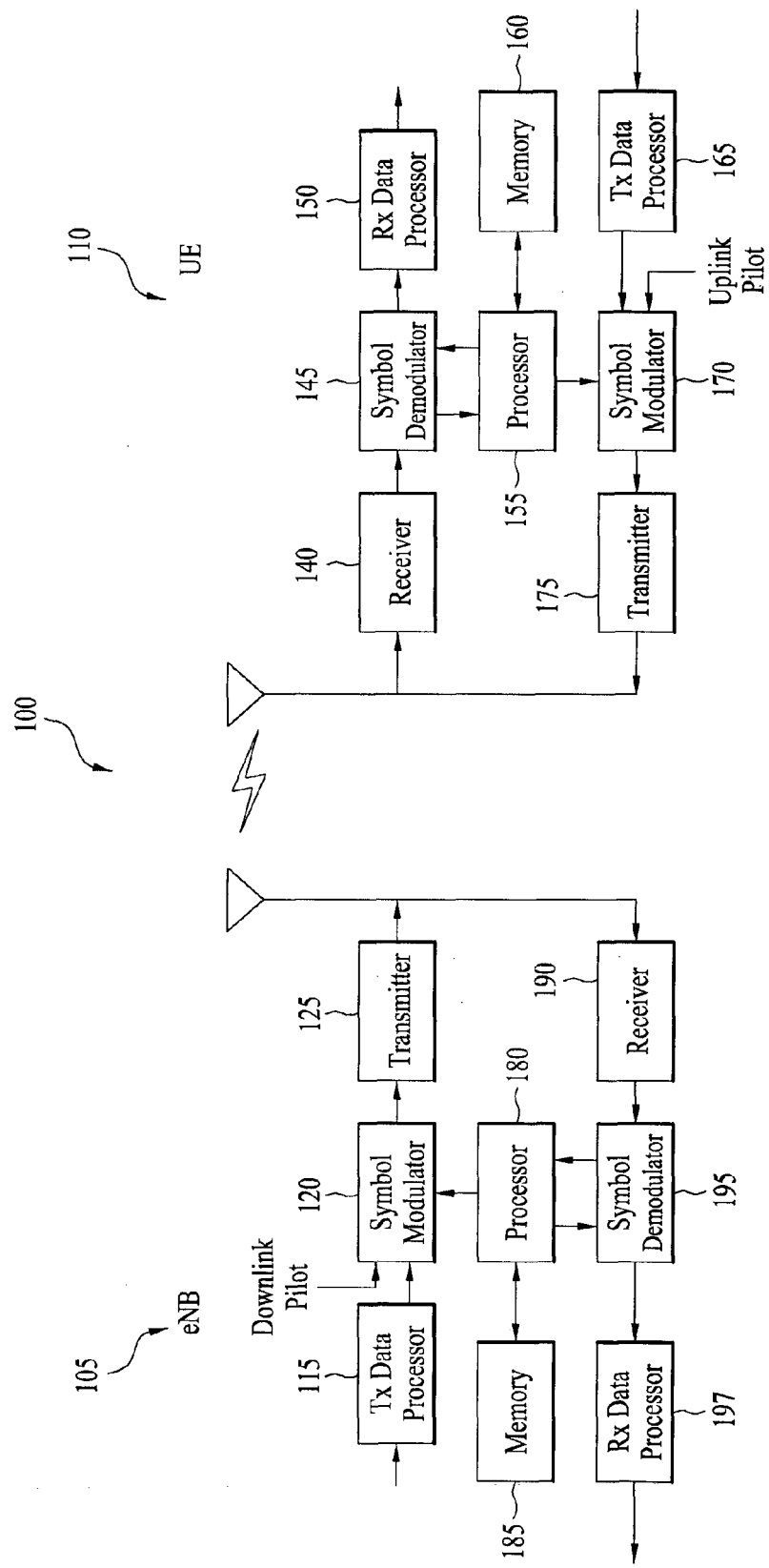
FIG. 1 is a block diagram illustrating structures of a base station (Bs) and a user equipment (UE) in a wireless communication system.

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that may be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A may be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an e-NodeB, a base station, access point (AP), etc. Throughout this specification, the technical features of the present invention are described based on an institute of electrical and electronic engineers (IEEE) 802.16 system, but may be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

It should be noted that specific terms disclosed in the present invention are proposed for convenience of description and better understanding of the present invention, and the use of these specific terms may be changed to other formats within the technical scope or spirit of the present invention.

FIG. 1 is a block diagram illustrating structures of a BS 105 and UE 110 in a wireless communication system 100.

Although, to simplify the wireless communication system 100, one BS 105 and one UE 110 (which includes a device-to-device (D2D) UE) are illustrated, the wireless communication system 100 may include one or more BSs and/or one or more UEs.

Referring to FIG. 1, the BS 105 may include a transmission (Tx) data processor 115, a symbol modulator 120, a transmitter 125, a transceiving antenna 130, a processor 180, a memory 185, a receiver 190, a symbol demodulator 195, and a reception (Rx) data processor 197. In addition, the UE 110 may include a Tx data processor 165, a symbol modulator 170, a transmitter 175, a transceiving antenna 135, a processor 155, a memory 160, a receiver 140, a symbol demodulator 145, and an Rx data processor 150. The transceiving antennas 130 and 135 are each illustrated as one antenna in the BS 105 and the UE 110, respectively. However, the BS 105 and the UE 110 may each include a plurality of transceiving antennas. Thus, the BS 105 and the UE 110 according to the present invention supports multiple input multiple output (MIMO). In addition, the BS 105 according to the present invention may support both single user-MIMO (SU-MIMO) and multi user-MIMO (MU-MIMO) schemes.

In downlink, the Tx data processor 115 receives traffic data, formats and codes the received traffic data, and interleaves and modulates (or symbol-maps) the coded traffic data to provide modulation symbols ("data symbols"). The symbol modulator 120 receives and processes the data symbols and pilot symbols to provide a stream of symbols.

The symbol modulator 120 multiplexes the data and pilot symbols and transmits the data and pilot symbols to the transmitter 125. In this case, each of the transmitted symbols may be a data symbol, a pilot symbol, or a signal value of zero. In each symbol period, pilot symbols may be sequentially transmitted. The pilot symbols may each be a frequency division multiplex (FDM) symbol, an orthogonal frequency division multiplex (OFDM) symbol, a time division multiplex (TDM) symbol, or a code division multiplex (CDM) symbol.

The transmitter 125 receives the stream of symbols, converts the stream into one or more analog signals, and further adjusts (for example, amplifies, filters, and frequency-upconverts) the analog signals to generate a downlink signal proper for transmission via a radio channel. Then, the transceiving antenna 130 transmits the generated downlink signal.

In configuration of the UE 110, the transceiving antenna 135 receives the downlink signal from the BS 105 and provides the received signal to the receiver 140. The receiver 140 adjusts (for example, filters, amplifies, and frequency-downconverts) the received signal, and digitizes the adjusted signal to acquire samples. The symbol demodulator 145 demodulates the received pilot symbols and provides the pilot symbols to the processor 155 for channel estimation.

In addition, the symbol demodulator 145 receives a frequency response estimated value for downlink from the processor 155, data-demodulates the received data symbols to acquire data symbol estimated values (which are estimation symbols of the transmitted data symbols), and provides the data symbol estimated values to the Rx data processor 150. The Rx data processor 150 demodulates (that is, symbol-demaps), deinterleaves, and decodes the data symbol estimated values to restore transmitted traffic data.

Processing by the symbol demodulator 145 and the Rx data processor 150 is auxiliary to processing by the symbol modulator 120 and the Tx data processor 115 in the BS 105, respectively.

In the UE 110, in uplink, the Tx data processor 165 processes traffic data to provide data symbols. The symbol modulator 170 may receive the data symbols and multiplex and demodulate the data symbols to provide a stream of the symbols to the transmitter 175. The transmitter 175 receives and processes the stream of the symbols to generate an uplink signal. In addition, the transceiving antenna 135 transmits the generated uplink signal to the BS 105.

In the BS 105, the uplink signal is received from the UE 110 through the transceiving antenna 130, and the receiver 190 acquires samples obtained by processing the received uplink signal. Then, the symbol demodulator 195 processes the samples to provide pilot symbols and a data symbol estimated value, which are received for uplink. The Rx data processor 197 processes the data symbol estimated value to restore the traffic data transmitted from the UE 110.

The processors 155 and 180 of the UE 110 and the BS 105 order (e.g., control, adjust, manage, etc.) operations in the UE 110 and the BS 105, respectively. The processors 155 and 180 may be respectively connected to the memories 160 and 185 that store program code and data. The memories 160 and 185 are connected to the processor 180 and store an operating system, applications, and general files.

According to the present invention, the processor 155 of the UE 110 and the processor 180 of the BS 105 perform operations of processing a signal and data except for a function of receiving or transmitting a signal. For convenience of description, hereinafter, the processors 155 and 180 will not be described in detail. Although the processors 155 and 180 are not described in detail, the processors 155 and 180 may perform a series of operations of processing data, etc. instead of operations of receiving or transmitting a signal.

The processors 155 and 180 may also be called controllers, microcontrollers, microprocessors, microcomputers, etc. The processors 155 and 180 may be embodied by hardware, firmware, software, or a combination thereof. When embodiments of the present invention are embodied using hardware, the processors 155 and 180 may include application specific integrated circuits (ASICs), digital signal processors (DSPs), digital signal processing devices (DSPDs), programmable logic devices (PLDs), field programmable gate arrays (FPGAs), etc. which are configured to implement the present invention.

When embodiments of the present invention are embodied using firmware or software, the firmware or the software may be configured to contain a module, process, or function used to perform functions or operations according to the present invention. The firmware or software configured to implement the present invention may be included in the processors 155 and 180 or may be stored in the memories 160 and 185 and driven by the processors 155 and 180.

Layers of a wireless interface protocol between a UE and a wireless communication system (network) and between a BS and the system may be classified into a first layer L1, a second layer L2, and a third layer L3 based on the three lower layers of the open systems interconnection (OSI) model that is well known in the field of communications. A physical layer belongs to the first layer L1 and provides an information transmission service through a physical channel. A radio resource control (RRC) layer belongs to the third layer and provides control radio resources between the UE and the network. The UE and the BS may exchange RRC messages through the wireless communication network and the RRC layer.

In order to perform communication, a cellular UE present in a cell in a cellular network or cellular communication accesses a BS, receives control information for transmitting and receiving data from the BS and then transmits and receives data to and from the BS. That is, the cellular UE transmits and receives data through the BS. Thus, in order to transmit data to another cellular UE, the cellular UE transmits data thereof to the BS, and the BS that receives the data transmits the received data to another cellular UE. In order to transmit data to another cellular UE, one cellular UE can transmit data only through the BS, and thus, the BS schedules channels and resources for data transmission and reception and transmits the scheduled information to each cellular UE. Likewise, in order to perform communication between cellular UEs through the BS, channels and resources for transmitting and receiving data to and from the BS need to be allocated. However, in device-to-device (D2D) communication, a D2D UE is configured to directly transmit and receive a signal to the UE to which the D2D UE wants to transmit data without a BS or a relay. Thus, it is necessary to design channel and resource structures in order to transmit and receive a signal without control of the BS. During this design, it is necessary to prevent collision of allocated resources and channels for conventional cellular UE when the D2D UE operates in a cellular network.

D2D communication refers to a short distance communication scheme for enabling direct communication between UEs without a BS (e-NodeB) when the UEs are adjacent to each other. Compared with a conventional communication scheme, a high data transmission rate may be achieved. In addition, since communication is performed without the e-NodeB, the number of UEs that can simultaneously use the same resource can be increased, thereby increasing usage efficiency of resources.

In a network supporting D2D communication, a cellular user receiving a conventional general communication service and a D2D user receiving a D2D service are present. Here, a mode for D2D communication of the D2D user may include a cellular communication mode in which communication between UEs is performed through a BS as the cellular user does, and a D2D communication mode in which communication between UEs is directly performed without the e-NodeB.

In this case, in the cellular mode in which data is transmitted through the e-NodeB, interference with another cellular user should not be present, and thus, dedicated resources need to be allocated. However, in the D2D communication mode for direct communication between UEs, data may be transmitted by allocating dedicated resources or sharing resources that are being used by another cellular user.

The present invention proposes a form of D2D communication that can be classified into two types.

1. UE-Initiated D2D Mode.

A UE-initiated D2D mode is a type supporting only the D2D communication mode and is used only by satisfying service requirements of using only the D2D communication mode since a higher data transmission rate is required than in the cellular mode, for example, proximity gaming, high-volume data transmission, or a service that is desired to be used only in the D2D communication mode only by UE. According to the UE-initiated D2D mode, a D2D service is initiated by request of the UE. Thus, a type in which D2D communication is initiated by the UE is referred to as the UE-initiated D2D mode.

In the UE-initiated D2D mode, the UE acquires a list of UEs that can communicate with the UE via D2D peer discovery, requests D2D service with a specific UE among the UEs to a network, is allocated resources from the network, and performs D2D communication. The UE-initiated D2D mode will be described with reference to FIG. 2.

Figure 2:
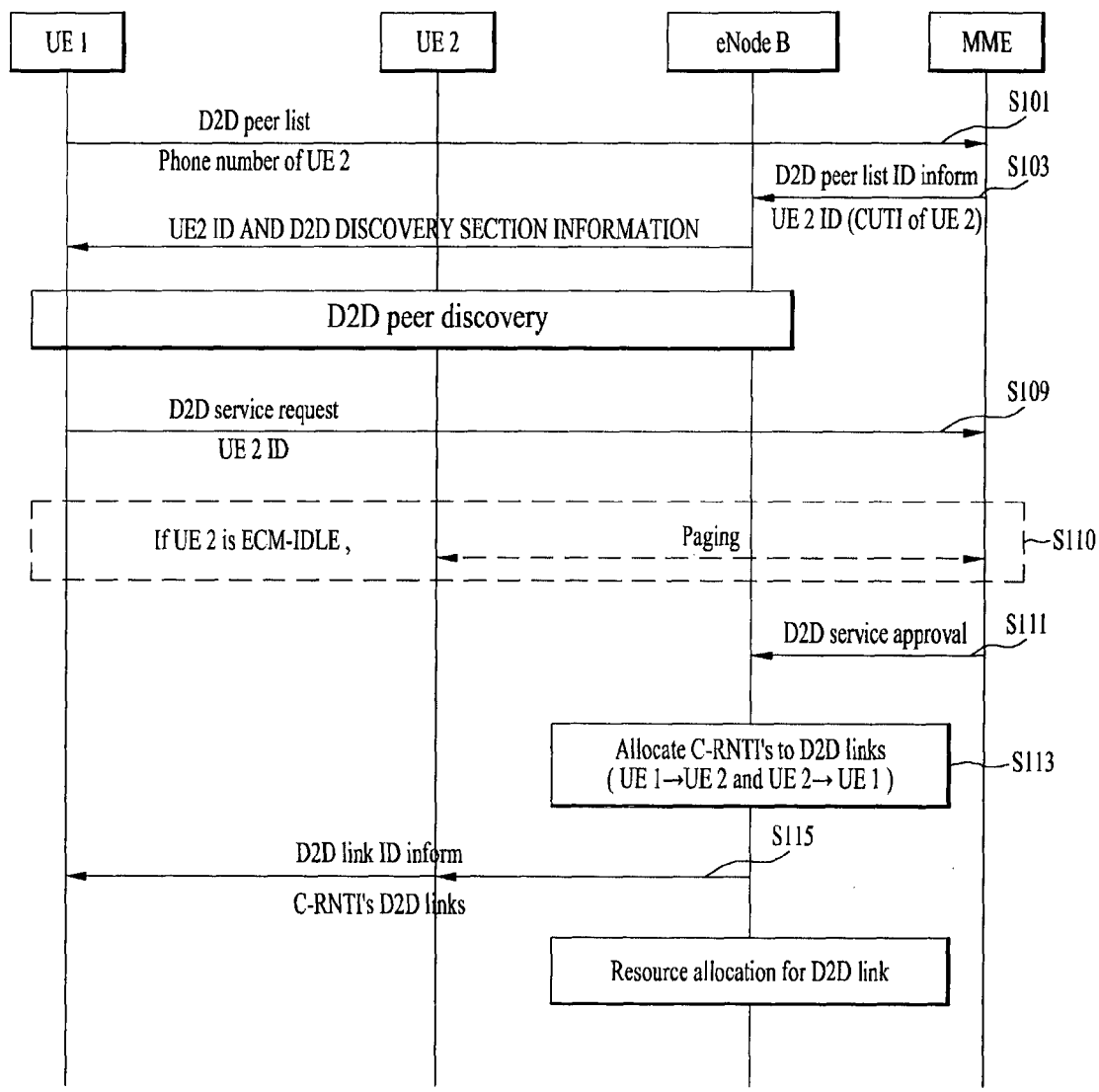
FIG. 2 is a flowchart of a method of performing device-to-device (D2D) communication according to an embodiment of the present invention.

FIG. 2 is a flowchart of a method of performing D2D communication according to an embodiment of the present invention.

First, a D2D communication request UE (hereinafter, UE1) that wants to request D2D communication informs a mobility management entity (MME) of a list of D2D communication target UE (hereinafter, UE2) of D2D communication (S101). In this case, the UE1 transmits an identifier (ID) of the UE2. The ID is a unique factor for identifying the UE2 around the world, and for example, includes a phone number or a MAC address. The MME informs a BS of a globally unique temporary identifier (GUTI) that is the ID of the UE2, received from the UE1 (S103).

The BS informs the UE1 of an ID of the UE2, received from MME, and transmits information regarding a D2D peer discovery section corresponding to the UE2 (S105).

The UE1 performs D2D peer discovery in order to determine whether D2D communication with the UE2 is possible (S107). Operations S105 and S107 will be described below in detail.

When the UE1 determines that the D2D communication with the UE2 is possible via operation S107, the UE1 requests the D2D communication with the UE2 is possible to the MME (S109). In this case, when the UE2 is in an ECM-idle state, the MME performs paging on the UE2 (S110).

When the MME approves D2D communication between the UE1 and the UE2, IDs of the UE1 and the UE2 are transmitted to an e-NodeB (S111). In this case, the e-NodeB allocates radio network temporary identifies (RNTIs) to D2D links between the UE1 and the UE2 (S113) and informs the UE1 and UE2 of the RNTIs, respectively (S115).

The e-NodeB may allocate resources to the D2D link through the corresponding RNTI such that the UE1 and the UE2 may perform D2D communication on each other.

The aforementioned operations S105 and S107 will now be described in more detail. With regard to D2D peer discovery, a D2D UE performing D2D communication needs to pre-check presence of adjacent D2D UEs that can transmit and receive data in order to transmit data to another D2D UE via D2D communication, and to this end, the D2D peer discovery is performed.

The present invention proposes a method of enabling the UE1 to perform D2D peer discovery regardless of an ECM-idle state or ECM-connected state of the UE1. The D2D peer discovery may be performed without changing a state of the UE2 to reduce unnecessary control signaling. For detailed description, the proposed method is described in terms of 3GPP LTE/LTE-A. However, the proposed method may be applied to other communication systems (IEEE 802.16, WiMAX, etc.).

Figure 3A:
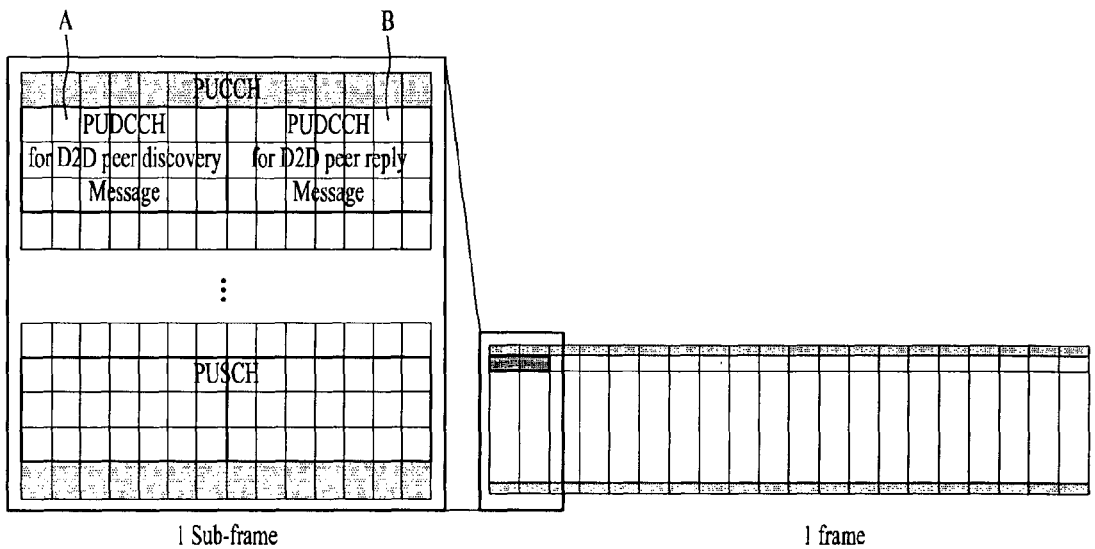
FIGS. 3A and 3B are exemplary diagrams of a subframe in which D2D communication is performed according to an embodiment of the present invention.
Figure 3B:
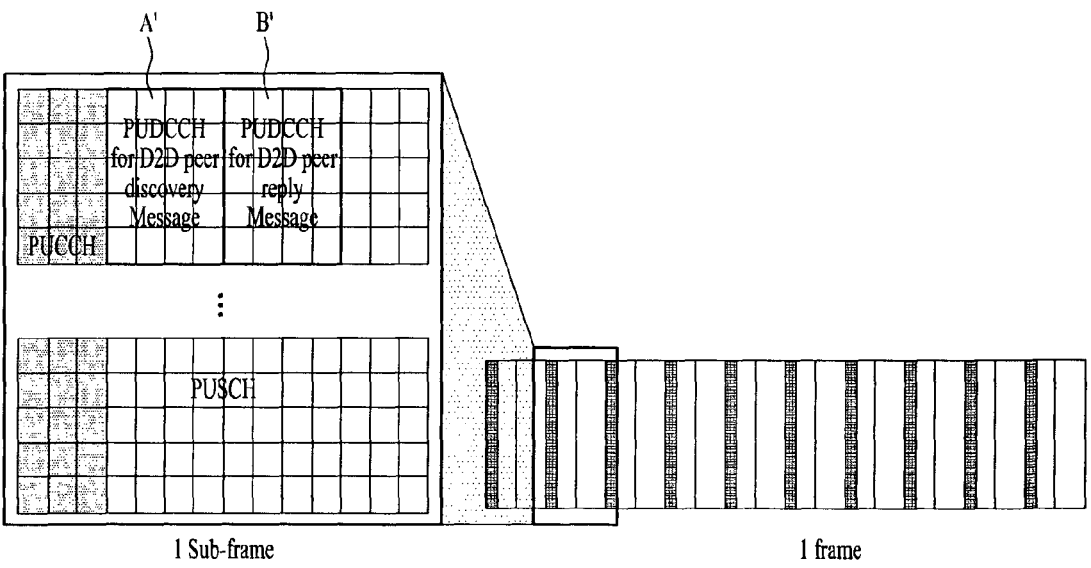

FIGS. 3A and 3B are exemplary diagrams of a subframe in which D2D communication is performed according to an embodiment of the present invention. FIG. 3A is illustrated assuming that uplink resources are allocated in a D2D communication mode and data is transmitted and received through a physical uplink shared channel (PUSCH). FIG. 3B is illustrated assuming that downlink resources are allocated in a D2D communication mode and data is transmitted and received via a physical downlink shared channel (PDSCH).

For D2D peer discovery, the following control channel is defined. A physical uplink D2D control channel (PUDCCH) or a physical downlink D2D control channel (PDDCCH) are periodically allocated like a conventional control channel, and an e-NodeB informs all UEs about information (the size of resource block allocated to the PDUCCH or the PDDCCH, a resource block index (e.g., an physical resource index (PRB)), transmission start time, and a transmission period) regarding the PDUCCH (or the PDDCCH) through system information.

Referring to FIG. 3A, the PUDCCH is divided into a section for transmitting a D2D peer discovery message and a section for receiving a D2D peer reply message. Any UE that can perform D2D communication may monitor the section for transmitting the D2D peer discovery message. The PUDCCH may be allocated to a specific location of resources of the PUSCH. In order to increase usage efficiency of resources, when data to be transmitted through the PUDCCH is not present, a resource block may not be allocated for the PUDCCH and may be allocated for uplink data transmission of other UEs.

From this point of view, FIG. 3B is the same as FIG. 3A. The PDDCCH is also divided into a section for transmitting a D2D peer discovery message and a section for receiving a D2D peer reply message. Any UE that can perform D2D communication may monitor the section for transmitting the D2D peer discovery message. The PDDCCH may be allocated to a specific location of resources of the PDSCH. In order to increase usage efficiency of resources, when data to be transmitted through the PDDCCH is not present, a resource block may not be allocated to the PDDCCH and may be allocated for uplink data transmission of other UEs.

FIG. 4 is a flowchart of a D2D peer discovery method according to an embodiment of the present invention.

First, a UE1 receives a UE2 ID and the D2D peer discovery section of the UE2 from a BS (S201).

The D2D peer discovery section may include the section for transmitting the D2D peer discovery message and the section for receiving the D2D peer reply message.

The UE1 transmits a D2D peer discovery message through a resource block A or A' for transmitting the D2D peer discovery message of the PUDCCH (or the PDDCCH) in the D2D peer discovery message transmission section received in operation S201 (S203).

In this case, since any UE that can perform D2D communication monitors the PUDCCH (or the PDDCCH), the UE2 may receive the D2D peer discovery message (S205). The UE2 receiving the D2D peer discovery message transmits the D2D peer reply message through a resource block B or B' for transmitting the D2D peer reply message of the PUDCCH (or the PDDCCH) (S207). When the UE1 receives the D2D peer reply message (S209), the UE1 determines that D2D communication with the UE2 transmitting the D2D peer reply message is possible (S211).

Figure 5:
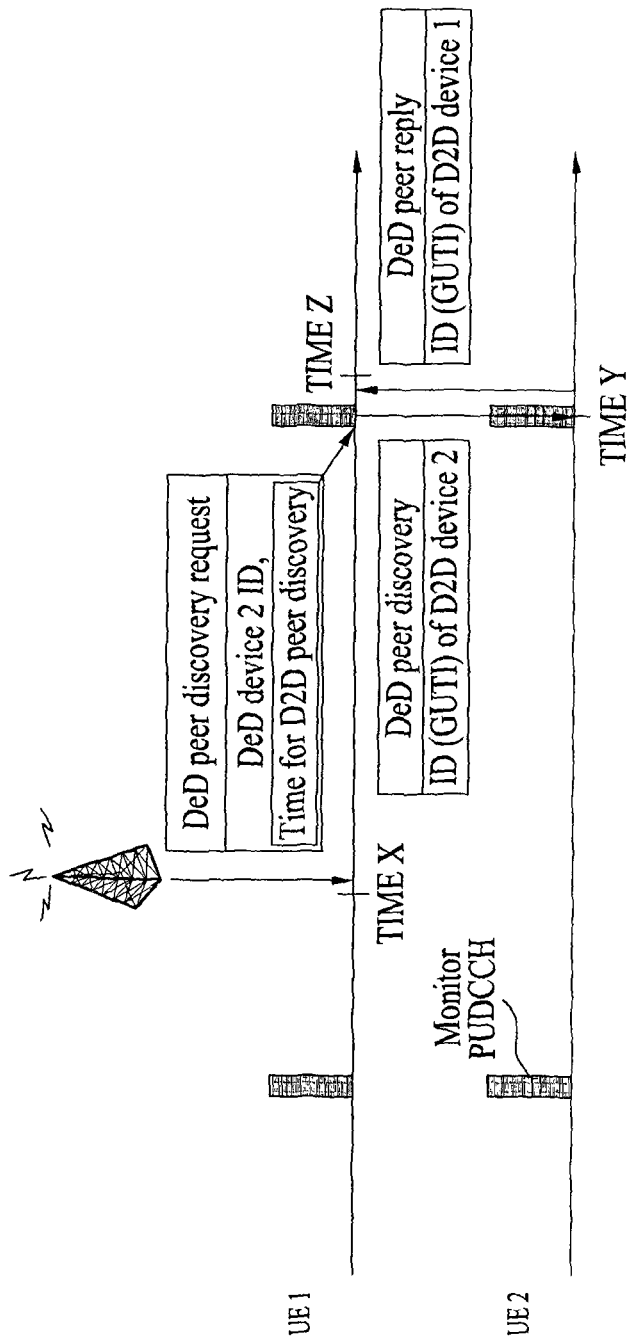
FIG. 5 is an exemplary diagram of a D2D peer discovery method according to an embodiment of the present invention.

FIG. 5 is an exemplary diagram of a D2D peer discovery method according to an embodiment of the present invention.

Referring to FIG. 5 in relation to FIG. 4, operation S201 corresponds to time X. The UE1 receives the UE2 ID and the D2D peer discovery section of the UE2 from the BS at the time X. In this case, transmission time of the D2D peer discovery message indicates time Y. The UE2 monitors the PUDCCH (or the PDDCCH) at the time Y and thus may receive the D2D peer discovery message (S205). In addition, the UE2 transmits the D2D peer reply message at time Z (S207).

2. MME-Initiated D2D Mode.

An MME-initiated D2D mode is a communication mode in which a network can dynamically select an optimal D2D mode according to a distance between UEs and a channel situation. In this regard, a D2D service may be selected according to request of a mobility management entity (MME). That is, when the MME that manages the mobility of UEs compares cell IDs in which the UEs are present, if the UEs are present in the same cell, the MME initiates D2D communication. This is referred to as the MME-initiated D2D mode. According to the MME-initiated D2D mode, when UEs that are communicating with each other are close to each other so as to perform D2D communication based on location information of the corresponding UEs, the MME periodically performs D2D peer discovery. In this case, when D2D communication can be performed, a D2D communication mode is used but otherwise resources are allocated so as to perform communication in a cellular mode. The MME-initiated D2D mode will be described with reference to FIG. 6.

Figure 6:
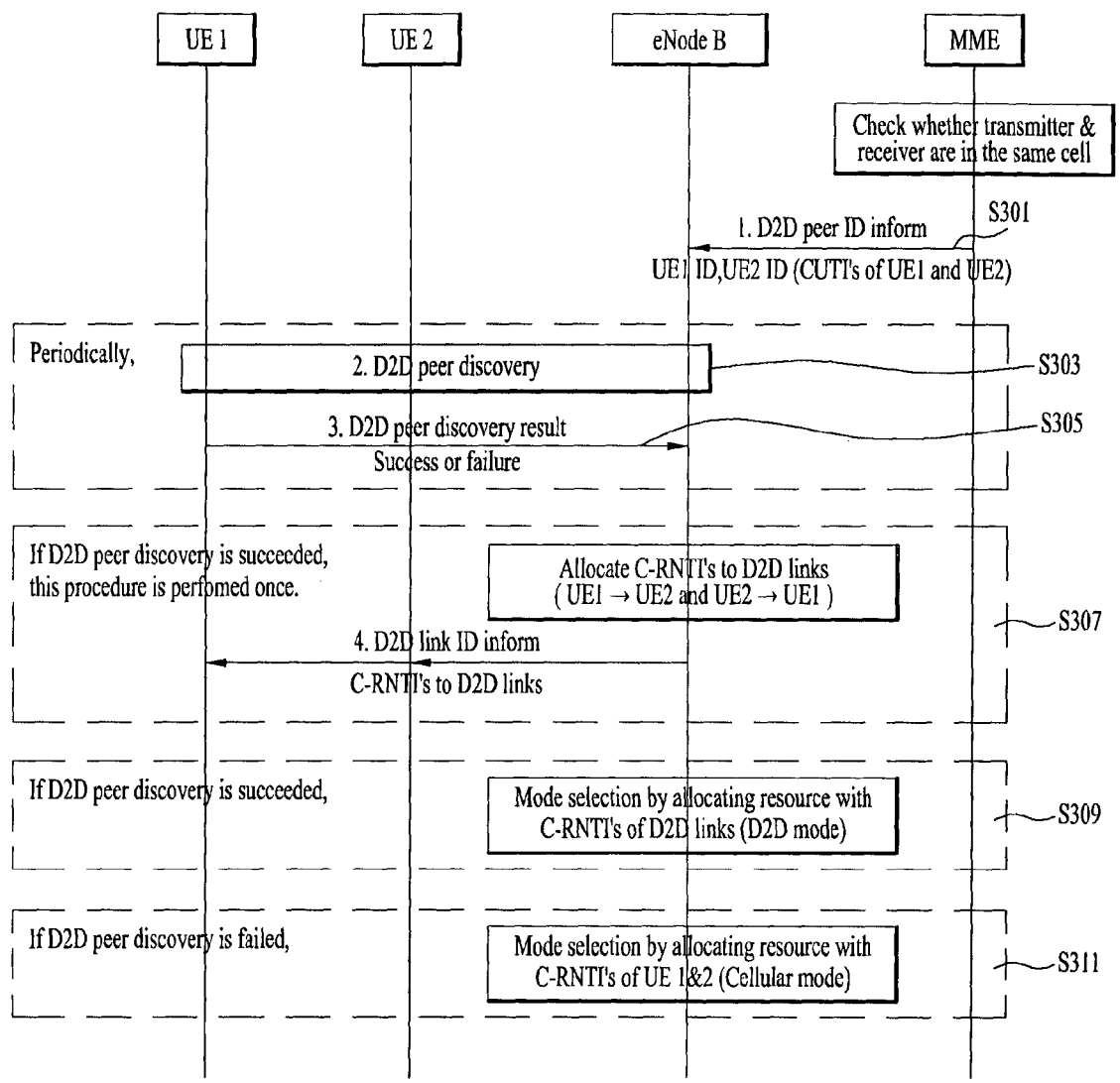
FIG. 6 is a flowchart of a D2D communication method according to an embodiment of the present invention.

FIG. 6 is a flowchart of a D2D communication method according to an embodiment of the present invention.

When an MME determines that a D2D communication mode is possible based on location information of UEs that communicate with each other, the MME informs a BS about IDs of corresponding UEs, that is, GUTI (S301). Various methods of determining possibility of the D2D communication mode by the MME may be used. For example, when the UEs are positioned in the same cell, the MME may determine that the D2D communication mode is possible.

The UE1 periodically determines whether D2D communication with the UE2 is possible (S303). Operation S303 is the same as the aforementioned D2D peer discovery process.

First, the UE1 receives the transmission time (time Y) of the UE2 ID and the D2D peer discovery message of the UE2 from a BS (S201). The UE1 transmits the D2D peer discovery message of the PUDCCH (or the PDDCCH) through the resource block A or A' for transmitting the D2D peer discovery message at the transmission time (time Y) received in operation S201 (S203). In this case, any UE that can perform D2D communication monitors the PUDCCH (or the PDDCCH), and thus, the UE2 may receive the D2D peer discovery message (S205). The UE2 that receives the D2D peer discovery message transmits the D2D peer reply message through the resource block B or B' for transmitting the D2D peer reply message of the PUDCCH (or the PDDCCH) at time Z (S207). When the UE1 receives the D2D peer reply message (S209), the UE1 determines that D2D communication with the UE2 transmitting the D2D peer reply message is possible (S211).

The UE1 informs the BS of a result obtained in operation S211 (S305). When the UE1 informs the BS that D2D communication with the UE2 is possible, the BS allocates RNTIs to D2D links between the UE1 and the UE2 and informs the UE1 and UE2 of the RNTIs, respectively (S307). The RNTI information allocated to the D2D links is not changed, and thus, a procedure of indicating the RNTI is performed only once.

Thus, when the UE1 informs the BS that D2D communication with the UE2 is possible, the BS allocates resource information to the D2D links through the RNTIs (S309). When the UE1 informs the BS that D2D communication with the UE2 is not possible, the BS allocates resource information using C-RNTIs that are allocated to the UE1 and the UE2, respectively (S311).

Operation S309 refers to a D2D communication mode between the UE1 and the UE2. Operation S311 refers to a general cellular mode. As described above, according to the MME-initiated D2D mode, when UEs that are communicating with each other are close to each other so as to perform D2D communication based on location information of the corresponding UEs, the MME periodically performs D2D peer discovery. In this case, when D2D communication can be performed, a D2D communication mode is used but otherwise resources are allocated so as to perform communication in a cellular mode.

INDUSTRIAL APPLICABILITY

The present invention provides a method and user equipment (UE) for performing or supporting device-to-device (D2D) communication in a wireless communication system, which can be industrially used in various communication systems such as 3GPP LTE, LTE-A, IEEE 802, etc.

The invention claimed is:

1. A method for performing device-to-device (D2D) communication by a D2D user equipment (UE) in a wireless communication system, the method comprising:
    informing a mobility management entity (MME) about a first identifier (ID) of a target UE of D2D communication;
    receiving information regarding a second ID and a D2D peer discovery section, corresponding to the target UE;
    wherein the D2D peer discovery section comprises a section for transmitting a D2D peer discovery message and a section for receiving a D2D peer reply message;
    transmitting the D2D peer discovery message to the target UE in the section for transmitting the D2D peer discovery message,
    receiving the D2D peer reply message from the target UE in the section for receiving the D2D peer reply message,
    determining whether the D2D communication with the target UE is possible,
    requesting the D2D communication with the target UE to the MME when the D2D communication with the target UE is possible; and
    receiving a D2D link ID allocated to the D2D link with the target UE from a base station (BS) receiving approval of communication of the MME.

2. The method according to claim 1, wherein the D2D peer discovery message and the D2D peer reply message are transmitted via a control channel allocated to a specific subframe.

3. The method according to claim 2,
wherein the control channel is a dedicated channel for a UE for performing D2D communication, and
wherein the control channel is allocated to a specific location of a physical uplink shared channel (PUSCH) resources or a physical downlink shared channel (PDSCH) resources, and a resource block for the control channel is dropped when data to be transmitted through the control channel is not present.

4. The method according to claim 1,
wherein the first ID comprises a unique phone number of the target UE, and
wherein the second ID comprises a global unique temporary identifier (GUTI).

5. A method for performing device-to-device (D2D) communication by a D2D user equipment (UE) in a wireless communication system, the method comprising:
receiving information regarding an ID and a D2D peer discovery section, corresponding to the target UE from a Base Station (BS);
wherein the D2D peer discovery section comprises a section for transmitting a D2D peer discovery message and a section for receiving a D2D peer reply message;
receiving information regarding the ID of the target UE and the D2D discovery section of the target UE from the BS,
transmitting the D2D peer discovery message to the target UE in the section for transmitting the D2D peer discovery message,
receiving the D2D peer reply message from the target UE in the section for receiving the D2D peer reply message,
determining whether the D2D communication with the target UE is possible,
transmitting a result of the determining to the BS; and
receiving a D2D link ID allocated to a D2D link with the target UE from the BS when the D2D communication with the target UE is possible.

6. The method according to claim 5,
wherein the D2D link ID comprises a radio network temporary identifier (RNTI), and
wherein the method further comprises:
performing the D2D communication with the target UE by receiving resource information through the RNTI when the RNTI allocated to the D2D link is received from the BS; and
performing the D2D communication with the target UE by receiving resource information through a preallocated C-RNTI when the RNTI allocated to the D2D link is not received from the BS.

7. The method according to claim 6, wherein the D2D peer discovery message and the D2D peer reply message are transmitted to a control channel allocated to a specific subframe.

8. The method according to claim 6,
wherein the control channel is a dedicated channel for a UE for performing D2D communication, and
wherein the control channel is allocated to a specific location of a physical uplink shared channel (PUSCH) resources or a physical downlink shared channel (PDSCH) resources, and a resource block for the control channel is dropped when data to be transmitted through the control channel is not present.

9. A device-to-device (D2D) user equipment (UE) for performing D2D communication in a wireless communication system, the D2D UE comprising:

a radio frequency (RF) module for transmitting a radio signal; and
a processor connected to the RF module and configured to:
inform a mobility management entity (MME) about a first identifier (ID) of a target UE of D2D communication,
control the RF module to receive information regarding a second ID and a D2D peer discovery section, corresponding to the target UE,
wherein the D2D peer discovery section comprises a section for transmitting a D2D peer discovery message and a section for receiving a D2D peer reply message,
control the RF module to transmit the D2D peer discovery message to the target UE in the section for transmitting the D2D peer discovery message,
control the RF module to receive the D2D peer reply message from the target UE in the section for receiving the D2D peer reply message,
determine whether the D2D communication with the target UE is possible,
request the D2D communication with the target UE to the MME when the D2D communication with the target UE is possible, and
control the RF module to receive a D2D link ID allocated to the D2D link with the target UE from a base station (BS) receiving approval of communication of the MME.

10. The D2D UE according to claim 9,
wherein the first ID comprises a unique phone number of the target UE, and
wherein the second ID comprises a global unique temporary identifier (GUTI).

11. A device-to-device (D2D) user equipment (UE) for performing D2D communication in a wireless communication system, the D2D UE comprising:
a radio frequency (RF) module for transmitting a radio signal; and
a processor connected to the RF module and configured to:
control the RF module to receive information regarding a ID and a D2D peer discovery section, corresponding to the target UE from a Base Station (BS),
wherein the D2D peer discovery section comprises a section for transmitting a D2D peer discovery message and a section for receiving a D2D peer reply message,
control the RF module to transmit the D2D peer discovery message to the target UE in the section for transmitting the D2D peer discovery message,
control the RF module to receive the D2D peer reply message from the target UE in the section for receiving the D2D peer reply message,
determine whether the D2D communication with the target UE is possible,
control the RF module to transmit a result of the determining to the BS, and
control the RF module to receive a D2D link ID allocated to a D2D link with the target UE from the BS when the D2D communication with the target UE is possible.

12. The D2D UE according to claim 11,
wherein the D2D link ID comprises a radio network temporary identifier (RNTI), and
wherein the processor further comprises to perform the D2D communication with the target UE by receiving resource information through the RNTI when the RNTI allocated to the D2D link is received from the BS, and to perform the D2D communication with the target UE by receiving resource information through a pre-allocated C-RNTI when the RNTI allocated to the D2D link is not received from the BS.

* * * * *